Figure 1:
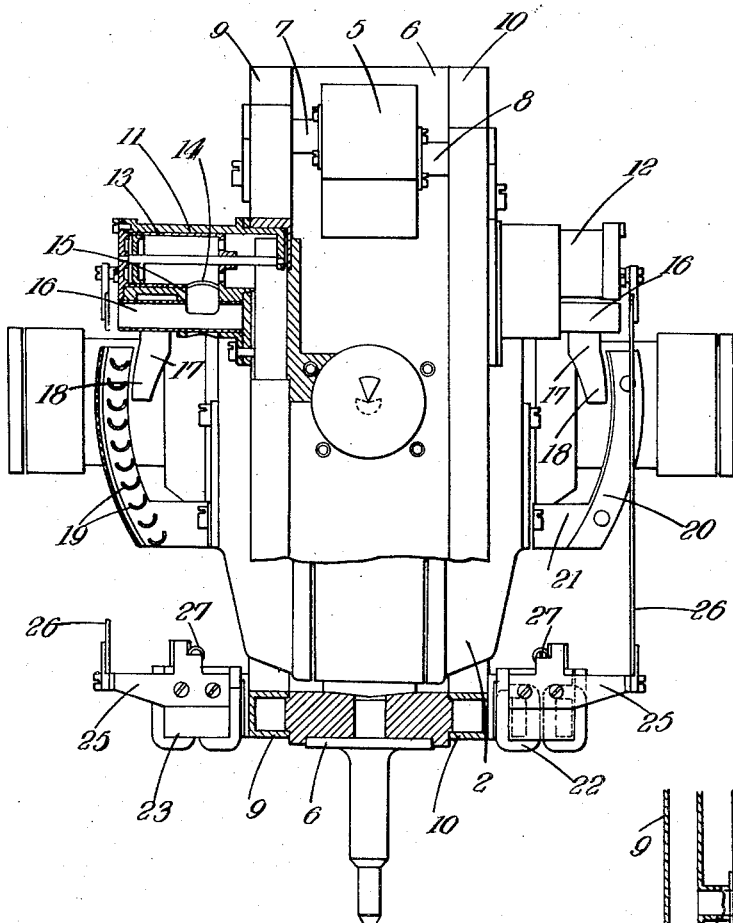

Oct. 7, 1930.  S. G. BROWN  1,777,601
GYROSCOPIC COMPASS
Filed Oct. 12, 1928  2 Sheets-Sheet 1

INVENTOR
SIDNEY GEORGE BROWN.
By O'Neill & Bunn
ATTORNEYS.

INVENTOR
SIDNEY GEORGE BROWN

Patented Oct. 7, 1930

1,777,601

UNITED STATES PATENT OFFICE

SIDNEY GEORGE BROWN, OF NORTH ACTON, ENGLAND

GYROSCOPIC COMPASS

Application filed October 12, 1928, Serial No. 312,153, and in Great Britain October 18, 1927.

This invention relates to an improved gyroscopic compass and its chief object is to eliminate or reduce the errors which commonly occur and to bring the compass, after wandering, back to its north-south direction and cause it rapidly to settle in this direction.

A gravity-controlled gyro compass as hitherto constructed is liable to be swung off its true path constantly as when it is accurately orientated it is at a point of no control and when moved, for example on changing the direction or speed of the ship, it moves from one point of no control to another point of no control and is consequently disturbed at every movement. On the other hand a compass of what is known as the slow wanderer or static type is very steady owing to its neutral mounting and to the fact that power is actually absorbed in moving the gyroscope, as distinguished from the ordinary compass where, when pointing correctly, the control is, as above explained, at its minimum or zero so far as the earth is concerned. The static compass on the other hand, owing to its neutral or substantially neutral condition, does not actually seek the north. According to this invention the desirable qualities of both types of compass are combined by alternating the compass action from the gravity control type to the static type. Thus if the compass has wandered it is brought back to the meridian under gravity control, reaching the meridian whilst slightly tilted, and on reaching the meridian the compass control is changed to the static type which takes out the tilt without further movement in azimuth.

In a type of compass in accordance with my English Patent No. 126,451 a static or "slow-wanderer" type of gyro compass is produced by providing a neutrally mounted gyro with means, such as an air blast, for producing a torque around the vertical axis which continuously takes out the tilt of the gyro and allows it to maintain its direction. According to one convenient method of conversion of the compass on the lines referred to above, the air blast which takes out the tilt can be cut out at intervals, preferably at regular intervals, for example by electrical means controlled by clockwork which closes up the air holes through which the blast is applied and transfers it to other channels. The compass may be predominantly in static condition, in which condition it may wander slowly from the north. The periods of alternation may however be equal or of any proportionate duration found desirable. On changing from the static condition the air blast which takes out the tilt is cut off and the blast diverted so as to act upon the tilt (or around the horizontal axis) and precess the compass towards the north. The application of the orienting torque around the horizontal axis can be arranged so as to give a definite natural period of oscillation to the undamped gyroscope, say for example a period of 100 minutes. In such a case the correcting torque would bring the compass back to the north in a quarter period, that is to say in 25 minutes. At the end of the quarter period the compass is converted back to its static condition and the air blast or other torque-applying means comes into action in a direction to take out the tilt without allowing the compass to continue its oscillatory movement. The effect of this is to stop the compass promptly as it passes the north and after a suitable interval with the compass in static condition it can be converted back to its normal north-seeking condition. The natural oscillation period of the compass can, of course, be adjusted by suitably proportioning the correcting torque to the rigidity of the gyroscope, any convenient period desired being produced for the undamped compass. If the air blast control is employed it would be connected to a pendulum or like gravity-control device, but as the gyroscope mounting is neutral the ballistic error can be eliminated by always reverting to the static condition when the ship is turning or accelerating such conversion being automatically effected if preferred.

The static condition of the compass can be employed so as to act as a damping device to take out the tilt and the conversion from one condition to the other can be effected by clockwork or other mechanism which produces the change at regular intervals, the period for the north-seeking or gravity-controlled condition of the compass being preferably made equal to the quarter period of compass oscillation.

In order that the said invention may be clearly understood and readily carried into effect, it will now be described more fully with reference to the accompanying drawing, which illustrates a construction of gyroscope in accordance with the invention in which the power necessary for control is derived from an air blast generated by the gyro wheel, and in which:—

Figure 3:
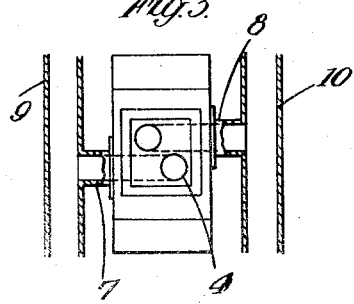
Figure 2:
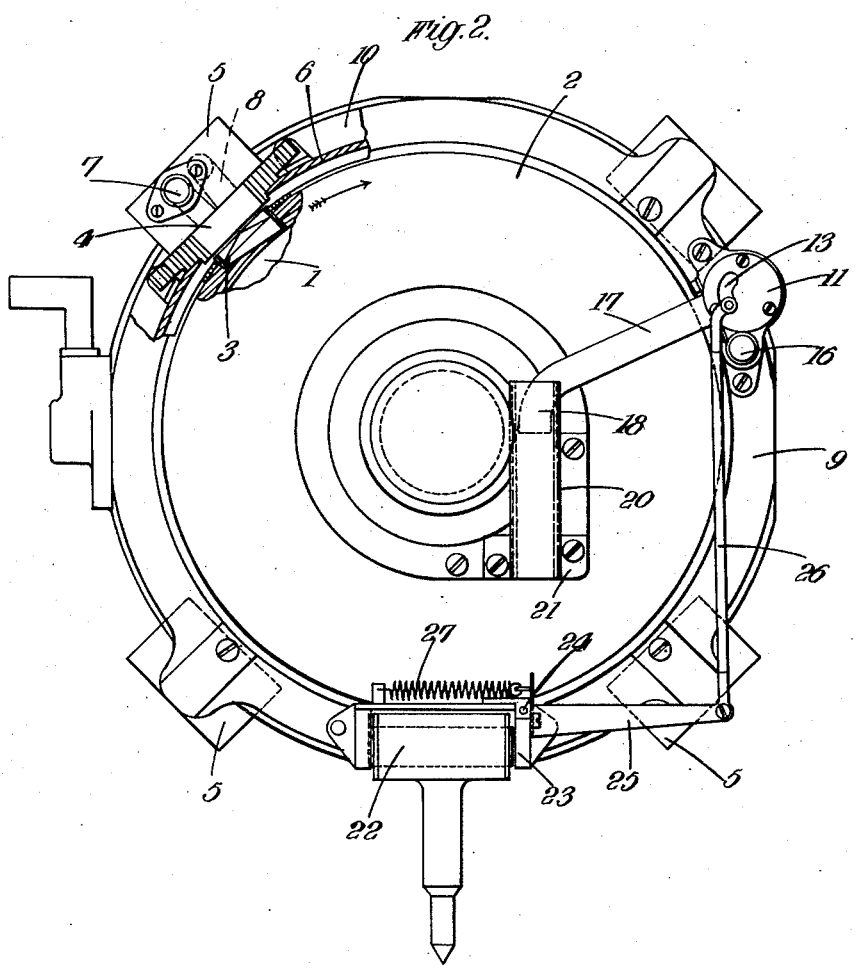

Figures 1 and 2 are views of the gyroscope taken at right angles to each other, mainly in elevation but partially in section, and Figure 3 depicts a detail.

The air blast generated by the gyro wheel 1 rotating within a casing 2 is delivered through apertures 3 located opposite openings 4 in four box-like structures 5 carried by the usual pivoted vertical ring 6 and spaced around it, as indicated in Figure 2. Each opening communicates by means of tubes 7 and 8 with two circular conduits 9 and 10 also attached to the vertical ring 6.

Figure 3 is an underside view of one of the box-like structures 5 located on the upper half of the ring 6, and it will be seen that the tubes 7 and 8 are extended so as to cross each other, whereby the opening of each into the box-like structure 5 is on the opposite side of the latter to that occupied by the conduit 9 or 10 into which the tube 7 or 8 leads as the case may be. In the case of the box-like structures located on the lower half of the ring 6 however, the tubes 7 and 8 do not cross each other, but their apertures in the opening 4 are arranged respectively on the same sides as the conduits 9 or 10, with which the tubes 7 or 8 respectively communicate. Thus, when the gyro casing 2 is not tilted, (referred to hereinafter and in the claims as its normal position) the air blast from the apertures 3 is directed equally into the tubes 7 and 8 and thus equal air pressures are generated in the conduits 9 and 10. If, however, tilt occurs it will be seen that, due to the above described arrangement of the opening of the tubes 7 and 8 in the respective box-like structures 5, the direction of the air blast will be more toward the tubes 7 or 8 with rise in pressure in the corresponding conduit 9 or 10, as the case may be, depending on the direction of the tilt. Communicating with the conduits 9 and 10 respectively are two valves 11 and 12 each having a sleeve 13 adapted to be rocked about its axis in the manner hereinafter described. Each sleeve is formed with an aperture 14 adapted, as indicated in Figure 1, to register with a port 15 whereby air from the conduit 9 or 10, as the case may be, may be delivered to a tube 16 opening into the atmosphere and constituting a nozzle for delivery of air. On the other hand, the sleeve 13 may be oscillated so that the aperture 14 registers with a port communicating with a tube 17 leading to a nozzle 18, whereby air may be delivered against a series of vanes 19 supported in a tube-like structure 20 carried, by means of a bracket 21, from the gyro casing 2. Thus, if the sleeves 13 be in the position shown in Figure 1, air is delivered from the nozzles 16 and the gyro operates under static conditions; obviously any excess of pressure in either of the conduits 9 or 10, due as above explained to tilt of the casing 2, will result in an increased blast from the corresponding nozzle 16, with the production of a torque around the vertical axis, the action being the same as that taking place in the compass described in the above mentioned English patent specification No. 126,451. On oscillation of the sleeves 13, however, the air blast is cut off from the ports 15 and nozzles 16 and is transferred to the tubes 17 and acts by means of the nozzles 18 on the vanes 19; thus any excess of pressure on the conduit 9 or 10 due to tilt results in a torque around the horizontal axis of the casing in such a direction as to take out the tilt to which the excess pressure is due, thereby restoring the casing to its normal position.

In order periodically to oscillate the sleeves 13 when it is desired to change over from static to gravity control, electro-magnets 22 are employed, these being excited from any suitable source of power through a clockwork-actuated switch whereby current is alternately supplied to and cut off from the electro-magnets for certain predetermined periods. Each electro-magnet is provided with an armature 23 pivoted at 24 and fitted with an arm 25 to which is jointed a rod 26 by means of which the sleeve 13 of the corresponding valve 11 and 12 is oscillated. As shown in Figure 2 the armature 23 is in its attracted position, the electro-magnet 22 being energized. On the current being interrupted by the clockwork-actuated switch however, a restoring spring 27 comes into action whereby the armature 23 and its arm 25 are rocked about the pivot 24 with corresponding oscillation of the sleeve 13. In order that any time desired, the gyroscope may be operated under static conditions, a manually-actuated switch may be inserted in the circuit of the electro-magnets 22. Alternatively this switch may be automatically actuated on acceleration or turning of the ship or the like by such means as a step-by-step repeater associated with the gyroscope.

As the air blast method effects a direct control of the gyroscope and the air jets tilt with the casing the usual quadrantal error does not appear.

While referring to an air blast system of compass operation it is to be understood that the use of an air blast is mentioned merely as an example and any other type of compass may be employed so long as it is adapted for conversion either into gravity control or static condition.

What I claim and desire to secure by Letters Patent of the United States is:—

1. A gyroscopic compass comprising means for applying equal and opposite torques alternately around the vertical or horizontal axis as the case may be when the compass is in its normal position and means for varying the said opposing torques when the compass deviates from its normal position.

2. A gyroscopic compass comprising a substantially vertical ring, a casing mounted within said ring, on a horizontal axis and enclosing the gyro wheel, means associated with said wheel for generating an air blast, and means associated with said ring for receiving said air blast and for directing it alternately along a course to produce a torque alternately about the vertical and the horizontal axis when said casing is inclined with respect to said ring.

3. A gyroscopic compass comprising a substantially vertical ring, a casing mounted within said ring and enclosing the gyro wheel, means associated with said wheel for generating an air blast, two conduits located on said ring, a two-way valve in communication with each of said conduits whereby the said air blast may be directed to produce a torque around either the vertical or horizontal axis as required and means for directing said air blast into said conduits equally when the compass is in its normal position and unequally when such position is deviated from.

4. A gyroscopic compass comprising a substantially vertical ring, a casing mounted within said ring and enclosing the gyro wheel, means associated with said wheel for generating an air blast, two conduits located on said ring, two-way valves each in communication with a respective conduit, oppositely facing horizontal discharge tubes on said ring placed at the same distance from the vertical axis and respectively in communication with said valves, a series of vanes fitted on each side of said casing and equidistant from the horizontal axis, tubes communicating respectively with said valves and adapted to direct said air blast respectively against said series of vanes and means for directing said air blast into said conduits equally when the compass is in its normal position and unequally when such position is deviated from.

5. A gyroscopic compass comprising a substantially vertical ring, a casing mounted within said ring and enclosing the gyro wheel, means associated with said wheel for on said ring, two-way valves each in communication with a respective conduit, means for directing said air blast into said conduits equally when the compass is in its normal position and unequally when such position is deviated from whereby a resultant torque around either the vertical or horizontal axis is generated as required and means for altering the setting of said valves in order to change the direction of application of said torque.

6. A gyro compass comprising a vertical ring, a casing mounted in said ring on a horizontal axis, a rotor in said casing, means carried by said rotor for generating an air blast, two conduits on said ring, means for directing said blast into said conduits, two sets of nozzles on said ring for inducing torques about the vertical and horizontal axes, respectively, a valve for each conduit whereby the air blast may be directed into either set of nozzles, electro-magnets for operating said valves, and means for periodically energizing said magnets.

SIDNEY GEORGE BROWN.